(12) United States Patent
Barkley et al.

(10) Patent No.: US 8,990,305 B2
(45) Date of Patent: Mar. 24, 2015

(54) TECHNIQUES FOR VIRTUAL CONFERENCING SERVERS

(75) Inventors: Warren V. Barkley, Redmond, WA (US); Philip A. Chou, Bellevue, WA (US); Regis J. Crinon, Redmond, WA (US); Tim Moore, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1521 days.

(21) Appl. No.: 11/583,275

(22) Filed: Oct. 18, 2006

(65) Prior Publication Data

US 2008/0095079 A1    Apr. 24, 2008

(51) Int. Cl.
*H04L 12/16* (2006.01)
*H04L 29/06* (2006.01)
*H04L 12/18* (2006.01)
*H04L 29/08* (2006.01)

(52) U.S. Cl.
CPC ........ *H04L 65/4038* (2013.01); *H04L 12/1827* (2013.01); *H04L 67/1008* (2013.01); *H04L 67/322* (2013.01); *H04L 67/101* (2013.01); *H04L 67/1031* (2013.01); *H04L 67/1034* (2013.01); *H04L 67/14* (2013.01); *H04L 67/1002* (2013.01); *H04L 67/148* (2013.01)
USPC .......................................... 709/205; 370/260

(58) Field of Classification Search
USPC .................................. 370/260, 261; 709/205
See application file for complete search history.

(56) References Cited

U.S. PATENT DOCUMENTS

| | | | |
|---|---|---|---|
| 6,195,680 B1 * | 2/2001 | Goldszmidt et al. .......... | 709/203 |
| 6,526,177 B1 | 2/2003 | Haskell et al. | |
| 6,567,813 B1 * | 5/2003 | Zhu et al. ...................... | 707/802 |
| 6,639,943 B1 | 10/2003 | Radha et al. | |
| 7,031,700 B1 * | 4/2006 | Weaver et al. ................ | 455/420 |
| 7,039,670 B2 * | 5/2006 | Hubbard et al. .............. | 709/201 |
| 7,353,277 B1 * | 4/2008 | Carney .......................... | 709/226 |
| 7,984,116 B2 * | 7/2011 | Hudson et al. ................ | 709/219 |
| 2001/0029526 A1 * | 10/2001 | Yokoyama et al. ........... | 709/218 |
| 2002/0169832 A1 * | 11/2002 | Lee et al. ...................... | 709/205 |
| 2003/0033543 A1 * | 2/2003 | Hubbard et al. .............. | 713/201 |

(Continued)

FOREIGN PATENT DOCUMENTS

| | | |
|---|---|---|
| EP | 1465427 | 10/2004 |
| JP | H06-098308 | 8/1994 |

(Continued)

OTHER PUBLICATIONS

Wenger, Stefan et al., "RTP Payload Format for H.264/SVC scalable video coding", J. of Zhejiang University Science A; An International Applied Physics and Engineering Journal, Springer, Berlin, DE, vol. 7, No. 5, May 1, 2006, pp. 657-667.

(Continued)

*Primary Examiner* — Kostas Katsikis
(74) *Attorney, Agent, or Firm* — Andrew Smith; Peter Taylor; Micky Minhas

(57) ABSTRACT

Techniques for virtual conferencing servers are described. An apparatus may comprise a conferencing server to manage a conference call with multiple client terminals. The conferencing server may have a virtual conference manager to select a first client terminal to operate as a first virtual conferencing server, and transfer conference call operations for a second client terminal from the conferencing server to the first virtual conferencing server. Other embodiments are described and claimed.

33 Claims, 3 Drawing Sheets

(56) References Cited

U.S. PATENT DOCUMENTS

| | | | |
|---|---|---|---|
| 2003/0083870 A1* | 5/2003 | Lee et al. | 704/229 |
| 2003/0158900 A1* | 8/2003 | Santos | 709/205 |
| 2004/0008635 A1* | 1/2004 | Nelson et al. | 370/260 |
| 2004/0032485 A1* | 2/2004 | Stephens, Jr. | 348/14.08 |
| 2004/0047342 A1* | 3/2004 | Gavish et al. | 370/352 |
| 2004/0047461 A1* | 3/2004 | Weisman et al. | 379/202.01 |
| 2005/0044384 A1* | 2/2005 | Kimura | 713/183 |
| 2005/0084086 A1* | 4/2005 | Hesse | 379/202.01 |
| 2005/0108328 A1* | 5/2005 | Berkeland et al. | 709/204 |
| 2005/0163062 A1* | 7/2005 | Salesky et al. | 370/260 |
| 2005/0262201 A1* | 11/2005 | Rudolph et al. | 709/205 |
| 2006/0072661 A1 | 4/2006 | Kim et al. | |
| 2006/0179147 A1 | 8/2006 | Tran et al. | |
| 2006/0206560 A1* | 9/2006 | Kanada | 709/201 |
| 2006/0212542 A1 | 9/2006 | Fang et al. | |
| 2006/0248309 A1* | 11/2006 | D'Alterio et al. | 711/206 |
| 2006/0265630 A1* | 11/2006 | Alberti et al. | 714/38 |
| 2007/0047735 A1* | 3/2007 | Celli et al. | 380/30 |
| 2010/0011061 A1* | 1/2010 | Hudson et al. | 709/204 |

FOREIGN PATENT DOCUMENTS

| | | |
|---|---|---|
| JP | H09-046680 | 2/1997 |
| JP | 2001-258004 | 9/2001 |
| JP | 2004-140667 | 5/2004 |
| WO | 2004056112 | 7/2004 |
| WO | WO 2007044455 A2 * | 4/2007 |

OTHER PUBLICATIONS

Wenger, Stefan et al., "RTP Payload Format for SVC Video; draft-wenger-avt-rtp-sc-02.txt", No. 2, Jun. 1, 2006 XP015045247, ISSN:0000-0004, 30 pages.

Wenger, Stefan et al., "RTP Payload Format for H.264 Video; rfc3984.txt", Feb. 1, 2005, XP015009755, ISSN:000-0003, 84 pages.

European Search Report received for European Patent Application No. 07868329.9, mailed Jan. 7, 2013, 9 pages.

Office Action received for Japanese Patent Application No. 2009-524766, mailed on Jan. 11, 2013, 9 pages including 5 pages English translation.

"ITU-T; White Book; audio visual/multimedia relevant (Hseries) recommendation report," pp. 380, 497, and 498, The ITU Association of Japan, Feb. 18, 1995.

Kodama, et al., "review of moving image information transformation describing method in MSP communication service," Technical Report of IEICE, vol. 98, No. 681, pp. 59-64, The Institute of Electronics, Information and Communication Engineers, Mar. 19, 1999.

\* cited by examiner

TECHNIQUES FOR VIRTUAL CONFERENCING SERVERS

BACKGROUND

Multimedia conference calls typically involve communicating voice, video, and/or data information between multiple endpoints. With the proliferation of data networks, multimedia conferencing is migrating from traditional circuit-switched networks to packet networks. To establish a multimedia conference call over a packet network, a conferencing server typically operates to coordinate and manage the conference call. The conferencing server receives a video stream from a sending participant and multicasts the video stream to other participants in the conference call.

As quality of service for packet networks increases, a conferencing server may manage a conference call with increasingly larger numbers of client terminals. Further, the client terminals may be geographically remote from each other, such as for national or international conference calls. A conferencing server, however, may have limited media processing resources. A packet network used by the conference call may also have limited bandwidth as well. Consequently, there may be a substantial need to improve conference call techniques to make efficient use of available conference call resources such as conferencing servers and/or client terminals.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments may be generally directed to techniques for improving multimedia conference calls. Some embodiments in particular may be directed to improving multimedia conference calls by arranging one or more client terminals to operate as virtual conferencing servers. The virtual conferencing servers may assist a conferencing server in providing conference call services or other media processing operations, such as security operations, routing video information, video or audio encoding/decoding/transcoding operations, adding or removing new participants, load balancing, high-reliability, media mixing, and so forth. The embodiments are not limited in this context.

In one embodiment, for example, a conferencing server may be arranged to manage a conference call with multiple client terminals. The conferencing server may include a virtual conference manager. The virtual conference manager may be arranged to select a client terminal to operate as a virtual conferencing server. In some cases, the virtual conference manager may transform multiple client terminals into multiple virtual conferencing servers, thereby forming virtual conferencing server clusters. The virtual conference manager may then transfer certain conference call operations and/or media processing operations for one or more other client terminals from the conferencing server to the virtual conferencing server or virtual conferencing server cluster. In this manner, conferencing call operations may be distributed or offloaded from the conferencing server to one or more virtual conferencing servers or virtual conferencing server clusters. Furthermore, certain media processing operations for a conference server, client terminal or group of client terminals may be distributed or offloaded to one or more virtual conferencing servers or virtual conferencing server clusters. Other embodiments are described and claimed.

BRIEF DESCRIPTION OF THE DRAWINGS

FIG. 2 illustrates an embodiment for a logic flow.

DETAILED DESCRIPTION

Various embodiments may be directed to techniques for implementing virtual conferencing servers for use in a multimedia conference call. In one embodiment, for example, a conferencing server may be arranged to manage a conference call with multiple client terminals. The conferencing server may include a virtual conference manager arranged to select one or more client terminals participating in a conference call to operate as a virtual conferencing server. Selection of the client terminals can be driven by criteria such as performance of the hardware, amount of dynamic memory available on the machine or bandwidth available on the connections to and from the machine hosting the client terminal. Once a client terminal has been selected, virtual conference manager may send control information to a virtual conferencing server module implemented for the selected client terminal. The virtual conferencing server module may receive the control information from virtual conference manager, and begin invoking or instantiating the appropriate conferencing server software with the appropriate conference call settings for a given conference call. In this manner, the selected client terminal may begin operating as a virtual conferencing server to assist or replace conferencing server. Once a client terminal has been transformed or instantiated as a virtual conferencing server, virtual conference manager may transfer or program the virtual conferencing server with certain conference call operations for one or more other client terminals from conferencing server to the virtual conferencing server. In this manner, conferencing call operations may be distributed or offloaded from the conferencing server to other virtual conferencing servers to more efficiently use conference call resources for a multimedia conference call.

Furthermore, virtual conferencing servers may be used to provide additional computing or communication resources for a conference call. In some embodiments, for example, certain media processing operations for a conferencing server, client terminal or group of client terminals may be distributed or offloaded to one or more virtual conferencing servers. For example, one or more virtual conferencing servers may perform security operations (e.g., encryption/decryption), packet processing, video encoding/decoding, video transcoding, trans-rating, audio encoding/decoding, media mixing, and so forth. One or more virtual conferencing servers may then provide the offloaded media processing operations to other client terminals involved in the conference call.

Figure 1:
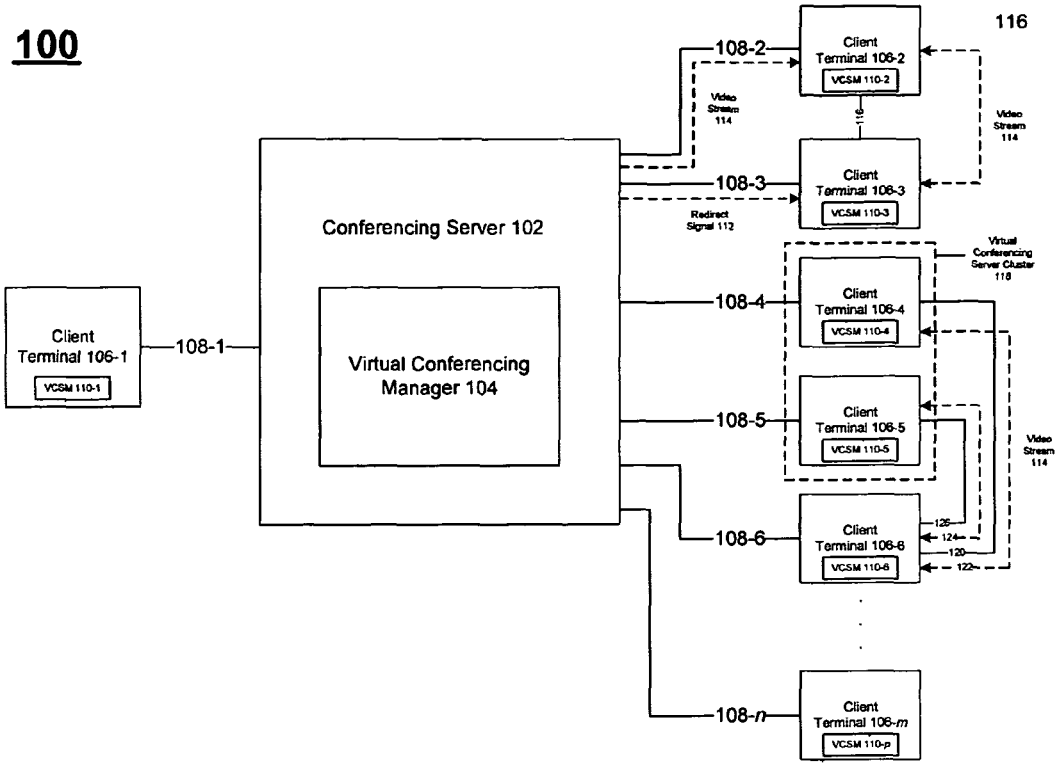
FIG. 1 illustrates an embodiment for a multimedia conference system.

FIG. 1 illustrates a block diagram for a multimedia conferencing system 100. Multimedia conferencing system 100 may represent a general system architecture suitable for implementing various embodiments. Multimedia conferencing system 100 may comprise multiple elements. An element may comprise any physical or logical structure arranged to perform certain operations. Each element may be implemented as hardware, software, or any combination thereof, as desired for a given set of design parameters or performance constraints. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software may include any software components, programs, applications, computer programs, application programs, system programs, machine programs, operating system software, middleware, firmware, software modules, routines, subroutines, functions, methods, interfaces, software interfaces, application program interfaces (API), instruction sets, computing code, computer code, code segments, computer code segments, words, values, symbols, or any combination thereof. Although multimedia conferencing system 100 as shown in FIG. 1 has a limited number of elements in a certain topology, it may be appreciated that multimedia conferencing system 100 may include more or less elements in alternate topologies as desired for a given implementation. The embodiments are not limited in this context.

In various embodiments, multimedia conferencing system 100 may be arranged to communicate, manage or process different types of information, such as media information and control information. Examples of media information may generally include any data representing content meant for a user, such as voice information, video information, audio information, image information, textual information, numerical information, alphanumeric symbols, graphics, and so forth. Control information may refer to any data representing commands, instructions or control words meant for an automated system. For example, control information may be used to route media information through a system, to establish a connection between devices, instruct a device to process the media information in a predetermined manner, and so forth.

In various embodiments, multimedia conferencing system 100 may include a conferencing server 102. Conferencing server 102 may comprise any logical or physical entity that is arranged to manage or control a multimedia conference call between client terminals 106-1-$m$. In various embodiments, conferencing server 102 may comprise, or be implemented as, a processing or computing device, such as a computer, a server, a router, a switch, a bridge, and so forth. A specific implementation for conferencing server 102 may vary depending upon a set of communication protocols or standards to be used for conferencing server 102. In one example, conferencing server 102 may be implemented in accordance with the International Telecommunication Union (ITU) H.323 series of standards and/or variants. The H.323 standard defines a multipoint control unit (MCU) to coordinate conference call operations. In particular, the MCU includes a multipoint controller (MC) that handles H.245 signaling, and one or more multipoint processors (MP) to mix and process the data streams. In another example, conferencing server 102 may be implemented in accordance with the Internet Engineering Task Force (IETF) Multiparty Multimedia Session Control (MMUSIC) Working Group Session Initiation Protocol (SIP) series of standards and/or variants. SIP is a proposed standard for initiating, modifying, and terminating an interactive user session that involves multimedia elements such as video, voice, instant messaging, online games, and virtual reality. Both the H.323 and SIP standards are essentially signaling protocols for Voice over Internet Protocol (VoIP) or Voice Over Packet (VOP) multimedia conference call operations. It may be appreciated that other signaling protocols may be implemented for conferencing server 102, however, and still fall within the scope of the embodiments. The embodiments are not limited in this context.

In various embodiments, multimedia conferencing system 100 may include one or more client terminals 106-1-$m$ to connect to conferencing server 102 over one or more communications links 108-1-$n$, where m and n represent positive integers that do not necessarily need to match. For example, a client application may host several client terminals each representing a separate conference at the same time. Similarly, a client application may receive multiple media streams. For example, video streams from all or a subset of the participants may be displayed as a mosaic on the participant's display with a top window with video for the current active speaker, and a panoramic view of the other participants in other windows. Client terminals 106-1-$m$ may comprise any logical or physical entity that is arranged to participate or engage in a multimedia conference call managed by conferencing server 102. Client terminals 106-1-$m$ may be implemented as any device that includes, in its most basic form, a processing system including a processor and memory (e.g., memory units 10-1-$p$), one or more multimedia input/output (I/O) components, and a wireless and/or wired network connection. Examples of multimedia I/O components may include audio I/O components (e.g., microphones, speakers), video I/O components (e.g., video camera, display), tactile (I/O) components (e.g., vibrators), user data (I/O) components (e.g., keyboard, thumb board, keypad, touch screen), and so forth. Examples of client terminals 106-1-$m$ may include a telephone, a VoIP or VOP telephone, a packet telephone designed to operate on a Packet Switched Telephone Network (PSTN), an Internet telephone, a video telephone, a cellular telephone, a personal digital assistant (PDA), a combination cellular telephone and PDA, a mobile computing device, a smart phone, a one-way pager, a two-way pager, a messaging device, a computer, a personal computer (PC), a desktop computer, a laptop computer, a notebook computer, a handheld computer, a network appliance, and so forth. The embodiments are not limited in this context.

Depending on a mode of operation, client terminals 106-1-$m$ may be referred to as sending client terminals or receiving client terminals. For example, a given client terminal 106-1-$m$ may be referred to as a sending client terminal when operating to send a video stream to conferencing server 102. In another example, a given client terminal 106-1-$m$ may be referred to as a receiving client terminal when operating to receive a video stream from conferencing server 102, such as a video stream from a sending client terminal, for example. In the various embodiments described below, client terminal 106-1 is described as a sending client terminal, while client terminals 106-2-$m$ are described as receiving client terminals, by way of example only. Any of client terminals 106-1-$m$ may operate as a sending or receiving client terminal throughout the course of conference call, and frequently shift between modes at various points in the conference call. The embodiments are not limited in this respect.

In various embodiments, multimedia conferencing system 100 may comprise, or form part of, a wired communications system, a wireless communications system, or a combination of both. For example, multimedia conferencing system 100 may include one or more elements arranged to communicate information over one or more types of wired communications links. Examples of a wired communications link may include, without limitation, a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. Multimedia conferencing system 100 also may include one or more elements arranged to communicate information over one or more types of wireless communications links. Examples of a wireless communications link may include, without limitation, a radio channel, infrared channel, radio-frequency (RF) channel, Wireless Fidelity (WiFi) channel, a portion of the RF spectrum, and/or one or more licensed or license-free frequency bands.

Multimedia conferencing system 100 also may be arranged to operate in accordance with various standards and/or protocols for media processing. Examples of media processing standards include, without limitation, the Society of Motion Picture and Television Engineers (SMPTE) 421M ("VC-1") series of standards and variants, VC-1 implemented as MICROSOFT® WINDOWS® MEDIA VIDEO version 9 (WMV-9) series of standards and variants, Digital Video Broadcasting Terrestrial (DVB-T) broadcasting standard, the ITU/IEC H.263 standard, Video Coding for Low Bit rate Communication, ITU-T Recommendation H.263v3, published November 2000 and/or the ITU/IEC H.264 standard, Video Coding for Very Low Bit rate Communication, ITU-T Recommendation H.264, published May 2003, Motion Picture Experts Group (MPEG) standards (e.g., MPEG-1, MPEG-2, MPEG-4), and/or High performance radio Local Area Network (HiperLAN) standards. Examples of media processing protocols include, without limitation, Session Description Protocol (SDP), Real Time Streaming Protocol (RTSP), Real-time Transport Protocol (RTP), Synchronized Multimedia Integration Language (SMIL) protocol, and/or Internet Streaming Media Alliance (ISMA) protocol. The embodiments are not limited in this context.

In one embodiment, for example, conferencing server 102 and client terminals 106-1-$m$ of multimedia conferencing system 100 may be implemented as part of an H.323 system operating in accordance with one or more of the H.323 series of standards and/or variants. H.323 is an ITU standard that provides specification for computers, equipment, and services for multimedia communication over networks that do not provide a guaranteed quality of service. H.323 computers and equipment can carry real-time video, audio, and data, or any combination of these elements. This standard is based on the IETF RTP and RTCP protocols, with additional protocols for call signaling, and data and audiovisual communications. H.323 defines how audio and video information is formatted and packaged for transmission over the network. Standard audio and video coders/decoders (codecs) encode and decode input/output from audio and video sources for communication between nodes. A codec converts audio or video signals between analog and digital forms. In addition, H.323 specifies T.120 services for data communications and conferencing within and next to an H.323 session. The T.120 support services means that data handling can occur either in conjunction with H.323 audio and video, or separately, as desired for a given implementation.

In accordance with a typical H.323 system, conferencing server 102 may be implemented as an MCU coupled to an H.323 gateway, an H.323 gatekeeper, one or more H.323 terminals 106-1-$m$, and a plurality of other devices such as personal computers, servers and other network devices (e.g., over a local area network). The H.323 devices may be implemented in compliance with the H.323 series of standards or variants. H.323 client terminals 106-1-$m$ are each considered "endpoints" as may be further discussed below. The H.323 endpoints support H.245 control signaling for negotiation of media channel usage, Q.931 (H.225.0) for call signaling and call setup, H.225.0 Registration, Admission, and Status (RAS), and RTP/RTCP for sequencing audio and video packets. The H.323 endpoints may further implement various audio and video codecs, T.120 data conferencing protocols and certain MCU capabilities. Although some embodiments may be described in the context of an H.323 system by way of example only, it may be appreciated that multimedia conferencing system 100 may also be implemented in accordance with one or more of the IETF SIP series of standards and/or variants, as well as other multimedia signaling standards, and still fall within the scope of the embodiments. The embodiments are not limited in this context.

In general operation, multimedia conference system 100 may be used for multimedia conference calls. Multimedia conference calls typically involve communicating voice, video, and/or data information between multiple end points. For example, a public or private packet network may be used for audio conferencing calls, video conferencing calls, audio/video conferencing calls, collaborative document sharing and editing, and so forth. The packet network may also be connected to the PSTN via one or more suitable VoIP gateways arranged to convert between circuit-switched information and packet information. To establish a multimedia conference call over a packet network, each client terminal 106-1-$m$ may connect to conferencing server 102 using various types of wired or wireless communications links 108-1-$n$ operating at varying connection speeds or bandwidths, such as a lower bandwidth PSTN telephone connection, a medium bandwidth DSL modem connection or cable modem connection, and a higher bandwidth intranet connection over a local area network (LAN), for example.

In various embodiments, conferencing server 102 may establish and manage a conference call between client terminals 106-1-$m$. Conferencing server 102 operates as a central server that controls and distributes media information in the conference. It handles the mixing and forwarding of the media information. One or more client terminals 106-1-$m$ may join a conference by connecting to conferencing server 102.

In some cases, however, conferencing server 102 may have a limited amount of conference call or media processing resources, such as input bit rate budget, output bit rate budget, processing constraints, memory constraints, number of ports, communication link bandwidth, and so forth. For example, conferencing server 102 may be servicing a relatively large number of client terminals 106-1-$m$ for a particular conference call that exceeds its media processing resources. In another example, client terminals 106-1-$m$ may be geographically remote or dispersed from each other, which typically happens for national or international conference calls. In yet another example, a packet network used by the conference call may also have limited bandwidth, or traffic loads may vary thereby dynamically changing the amount of instantaneously available bandwidth for a given communication link 108-1-$n$. In yet another embodiment, conferencing server 102 may exceed a number of available client ports. In still another embodiment, conferencing server 102 may need high-availability operations and therefore backup operations in case of failure or maintenance. These and other problems may limit the number and scope of services offered by conferencing server 102.

Various embodiments may attempt to solve these and other problems by efficiently utilizing all of the computing and/or communication resources available for a device or network involved in providing a given conference call, such as conferencing server 102 and/or client terminals 106-1-$m$. For example, some embodiments may improve multimedia conference calls by arranging one or more client terminals 106-1-$m$ to operate as virtual conferencing servers. The virtual conferencing servers may assist conferencing server 102 in providing various conference call services and media processing services. Using some client terminals 106-1-*m* as virtual conferencing servers may reduce, or in some cases eliminate, the need for one or more dedicated conferencing servers and their associated costs. In addition, the distribution system between conferencing server 102 and the virtual conferencing servers is automatically organized since conferencing server 102 needs to send video streams to client terminals 106-1-*m* at their current network locations already. Furthermore, if the virtual conferencing server is on the same subnet (or otherwise connected via a multicast distribution network) as the other client terminals 106-1-*m*, it can multicast the traffic to the client terminals 106-1-*m* rather than send a copy of the media to each client terminal 106-1-*m* independently, saving both processing cycles on the virtual conferencing server and network bandwidth. Other advantages of virtual conferencing servers may include, but are not limited to, load balancing operations where the conference client terminals 106-1-*m* can be shared among the virtual conferencing servers to distribute the load, fail over operations where if more than one conferencing server is part of a conference a client terminal 106-1-*m* can move itself or be moved if the conferencing server it is attached to suffers operational failure, bandwidth savings where media can be forwarded to the virtual conferencing server closest to a certain number of client terminals 106-1-*m* before being forwarded to the client terminals 106-1-*m* thereby saving bandwidth on the communication links 108-1-*n* between the virtual conferencing servers, and so forth.

In one embodiment, for example, conferencing server 102 may be arranged to manage a conference call with multiple client terminals 106-1-*m*. Conferencing server 102 may include a virtual conference manager 104. Virtual conference manager 104 may be arranged to select a client terminal 106-1-*m* participating in a conference call to operate as a virtual conferencing server. Virtual conference manager 104 may select a particular client terminal 106-1-*m* based on various types of selection criteria, as described in detail below. One important function of the virtual conference manager 104 is to record the state of the audio/video processing and the signaling states in the conferencing server 102 and to communicate these states to the virtual servers so these virtual servers can mirror the tasks performed by the conferencing server 102.

Once a client terminal 106-1-*m* has been selected, virtual conference manager 104 may send control information to a virtual conferencing server module (VCSM) 110-1-*p* implemented for the selected client terminal 106-1-*m*. The virtual conferencing server module 110-1-*p* may receive the control information (e.g., state of the processing) from virtual conference manager 104, and begin invoking or instantiating the appropriate conferencing server software with the appropriate conference call settings for a given conference call. In this manner, the selected client terminal 106-1-*m* may begin operating as a virtual conferencing server to assist or replace conferencing server 102. Once a client terminal 106-1-*m* has been transformed or instantiated as a virtual conferencing server, virtual conference manager 104 may transfer or program the virtual conferencing server with certain conference call operations for one or more other client terminals 106-1-*m* from conferencing server 102 to the virtual conferencing server. In this manner, conferencing call operations may be distributed or offloaded from conferencing server 102 to other virtual conferencing servers. It is worthy to note that to offload functions such as rate matching, the conference server 102 may need to forward partially processed video and/or audio streams to the client terminals acting as virtual conference servers so the completion of the process can be executed in the client terminal. For example, in the case of scalable video, the conference server 102 may perform partial removal of temporal/spatial layers and the remaining removal or temporal/spatial layers is done in the virtual servers.

In some cases, virtual conference manager 104 may transform multiple client terminals 106-1-*m* into multiple virtual conferencing servers, thereby forming virtual conferencing server clusters to service particular sets of client terminals 106-1-*m*. The virtual conferencing server clusters may be used to connect together conference call resources for a larger conference or to reduce the amount of traffic between particular destinations. Each client terminal 106-1-*m* connecting to conference server 102 is sent a copy of the media information, typically in the form of a video stream or bitstream. So the amount of traffic from conferencing server 102 or a virtual conferencing server is the sum of all the traffic between client terminals 106-1-*m* and conferencing server 102 or the virtual conferencing server. If there is a large number of client terminals 106-1-*m* at a particular network location, then having a local virtual conferencing server to obtain a single video stream from conferencing server 102 (or a remote virtual conferencing server) may reduce network traffic between network locations.

Furthermore, certain media processing operations for a client terminal 106-1-*m* or group of client terminals 106-1-*m* may be distributed or offloaded from conferencing server 102 and/or one or more client terminals 106-1-*m* to one or more virtual conferencing servers. For example, one or more virtual conferencing servers may perform security operations (e.g., encryption/decryption), packet processing, video encoding/decoding, video transcoding, trans-rating, audio encoding/decoding, media mixing, and so forth. One or more virtual conferencing servers may then provide the offloaded media processing operations to other client terminals 106-1-*m* involved in the conference call. Multimedia conferencing system 100 in general, and virtual conference manager 104 and virtual conferencing server module 110 in particular, may be described in more detail with reference to FIGS. 2 and 3.

Figure 2:
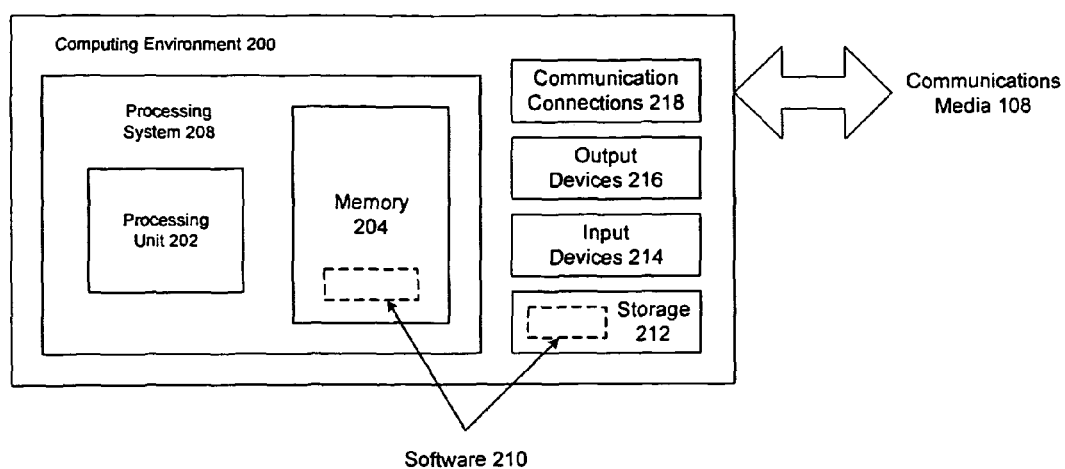
FIG. 2 illustrates an embodiment for a computing environment.

FIG. 2 illustrates a block diagram of computing environment 200. Computing environment 200 may be implemented as a device, or part of a device, such as conferencing server 102 and/or client terminals 106-1-*m*. In some embodiments, computing environment 200 may be implemented to execute software 210. Examples of software 210 may include virtual conference manager 104 and/or virtual conferencing server modules 110-1-*p*. For example, when computing environment 200 is implemented as part of conferencing server 102, software programs 210 may include virtual conference manager 104 and accompanying data. In another example, when computing environment 200 is implemented as part of a client terminal 106-1-*m*, software programs 210 may include virtual conferencing server modules 110-1-*p* and accompanying data. In yet another example, when computing environment 200 is implemented as part of conferencing server 102 and/or client terminal 106-1-*m*, software programs 210 may include an operating system or other system software typically implemented for an electrical, electronic, and/or electro-mechanical device, such as a graphical user interface. Although some embodiments may be described with operations for virtual conference manager 104 and/or virtual conferencing server modules 110-1-*p* implemented as software stored and executed by computing environment 200, it may be appreciated that the operations for software modules 104, 110 may be implemented using dedicated hardware, software or any combination thereof. The embodiments are not limited in this context.

In its most basic configuration, computing environment 200 typically includes a processing system 208 that comprises at least one processing unit 202 and memory 204. Processing unit 202 may be any type of processor capable of executing software, such as a general-purpose processor, a dedicated processor, a media processor, a controller, a microcontroller, an embedded processor, a digital signal processor (DSP), and so forth. Memory 204 may be implemented using any machine-readable or computer-readable media capable of storing data, including both volatile and non-volatile memory. For example, memory 204 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information.

As shown in FIG. 2, memory 204 may store various software programs 210, such as virtual conference manager 104, virtual conferencing server module 110, and accompanying data. In some cases, such as for virtual conference manager 104, software programs 210 may have to be duplicated in the memory if it is designed to handle one media stream at a time. Likewise, processor 202 and virtual conference manager 104 may be duplicated several times if the host system is a multi-core microprocessor-based computing platform. Memory 204 may also store other software programs to implement different aspects of conferencing server 102, such as various types of conference call software, operating system software, application programs, video codecs, audio codecs, security software, call control software, gatekeeper software, multipoint controllers, multipoint processors, and so forth. Alternatively such operations may be implemented in the form of dedicated hardware (e.g., DSP, ASIC, FPGA, and so forth) or a combination of hardware, firmware and/or software as desired for a given implementation. The embodiments are not limited in this context.

Computing environment 200 may also have additional features and/or functionality beyond configuration 208. For example, computing environment 200 may include storage 212, which may comprise various types of removable or non-removable storage units. Storage 212 may be implemented using any of the various types of machine-readable or computer-readable media as previously described. Computing environment 200 may also have one or more input devices 214 such as a keyboard, mouse, pen, voice input device, touch input device, and so forth. One or more output devices 216 such as a display device, speakers, printer, and so forth may also be included in computing environment 200 as well.

Computing environment 200 may further include one or more communications connections 218 that allow computing environment 200 to communicate with other devices via communication links 108-1-$n$. Communications connections 218 may include various types of standard communication elements, such as one or more communications interfaces, network interfaces, network interface cards (NIC), radios, wireless transmitters/receivers (transceivers), wired and/or wireless communication media, physical connectors, and so forth. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes both wired communications media and wireless communications media, as previously described. The terms machine-readable media and computer-readable media as used herein are meant to include both storage media and communications media.

In various embodiments, computing environment 200 may be implemented as part of conferencing server 102. In particular, computing environment 200 may be implemented with software programs 210 to include virtual conference manager 104. Virtual conference manager 104 may be arranged to select a first client terminal to operate as a first virtual conferencing server, and transfer conference call operations for a second client terminal from conferencing server 102 to the first virtual conferencing server.

In various embodiments, computing environment 200 may be implemented as some or all of client terminals 106-1-$m$. In particular, computing environment 200 may be implemented with software programs 210 to include one or more virtual conferencing server modules 110-1-$p$. Once virtual conference manager 104 selects one or more client terminals 106-1-$m$ to operate as virtual conferencing servers, virtual conference manager 104 may send control information to a virtual conferencing server module 110-1-$p$ implemented for the selected client terminal 106-1-$m$. Virtual conferencing server module 110-1-$p$ may receive the control information from virtual conference manager 104, and begin invoking or instantiating the appropriate conferencing server software with the appropriate conference call settings for a given conference call. In this manner, the selected client terminal 106-1-$m$ may begin operating as a virtual conferencing server. Once a client terminal 106-1-$m$ has been transformed or instantiated as a virtual conferencing server, virtual conference manager 104 may transfer or program the virtual conferencing server with certain conference call operations for one or more other client terminals 106-1-$m$ from conferencing server 102 to the virtual conferencing server. In this manner, conferencing call operations may be distributed or offloaded from conferencing server 102 to other virtual conferencing servers.

If conferencing server 102 can learn or be made aware of the network locations for some or all of client terminals 106-1-$m$, virtual conference manager 104 can generate a distribution plan for the conference call and signal some client terminals 106-1-$m$ to become virtual conferencing servers, and then signal other client terminals 106-1-$m$ to transfer to one of the virtual conferencing servers.

In one embodiment, for example, virtual conference manager 104 may determine a location for multiple client terminals 106-1-$m$ in a conference call. When setting up a conference call, multiple client terminals 106-1-$m$ may request to join a conference call via conferencing server 102. During join operations, each client terminal 106-1-$m$ may send location information to indicate a geographic location for the client terminal 106-1-$m$. In some cases the location information may be explicit location information, such as global positioning satellite (GPS) coordinates, map information (e.g., longitude, latitude, altitude and other map coordinates), and so forth. In some cases, the location information may be implicit location information suitable for deriving location information for a client terminal 106-1-$m$, such as a network address, device address, a minimum number of hops to reach the client terminal on the network, device identifier, telephone number, electronic mail address, or other unique identifier. Virtual conference manager 104 may convert the different types of location information into a common format used by all client terminals 106-1-*m* to perform consistent mapping.

Once virtual conference manager 104 receives location information for all or some of client terminals 106-1-*m*, virtual conference manager 104 may generate a distribution plan based on the location information. The distribution plan may comprise a plan to distribute data among multiple locations and/or client terminals 106-1-*m*. The distribution plan may use various data distribution algorithms to determine efficient distribution of media information across all the client terminals 106-1-*m* involved in a given conference call.

As part of the distribution plan, or in lieu of a distribution plan, virtual conference manager 104 may use various other criteria or factors when selecting a given client terminal 106-1-*m* to become a virtual conferencing server. Virtual conference manager 104 can, for example, use information derived from bandwidth estimates of communication links 108-1-*n* communicating the media information to each client terminal 106-1-*m* to estimate the bandwidth available to each client terminal 106-1-*m*, and which client terminals 106-1-*m* can handle the additional bandwidth requirements needed to operate as a virtual conferencing server.

In one embodiment, for example, virtual conference manager 104 may use bandwidth estimates for communication links 108-1-*n* between conferencing server 102 and client terminals 106-1-*m*. Virtual conference manager 104 may receive bandwidth estimates from client terminals 106-1-*m*. The bandwidth estimates may be for corresponding communication links 108-1-*n*. Virtual conference manager 104 may take a bandwidth estimate for a first client terminal, and a bandwidth for a second client terminal, and compare the first bandwidth estimate with the second bandwidth estimate. If the first bandwidth estimate is sufficient to include or absorb the bandwidth requirements for both the first client terminal and the second client terminal, virtual conference manager 104 may select the first client terminal as a virtual conferencing server. Virtual conference manager 104 may then redirect the video stream intended for the second client terminal from the communication link used for the second client terminal to the communication link used for the first client terminal. The first client terminal operating as a virtual conferencing server may then forward the video stream to the second client terminal using a communication link between the first and second client terminals.

Referring again to FIG. 1, by way of example, assume the first client terminal is client terminal 106-2 and the second client terminal is client terminal 106-3. In normal operation, conferencing server 102 may communicate media in the form of a video stream to client terminals 106-2, 106-3 via communication links 108-2, 108-3, respectively. Virtual conference manager 104 may receive bandwidth estimates from client terminals 106-2, 106-3 for communication links 108-2, 108-3, respectively. Alternatively, conferencing server 102 may obtain the bandwidth estimates by direct measurement of traffic for communication links 108-2, 108-3, or from some other source. Virtual conference manager 104 may compare the bandwidth estimates for communication links 108-2, 108-3. If the first bandwidth estimate for communication link 108-2 is sufficient to include bandwidth requirements for both communication links 108-2 and 108-3, virtual conference manager 104 may select client terminal 106-2 as a virtual conferencing server, and redirect video stream 114 intended for client terminal 106-3 from communication link 108-3 used for client terminal 106-3 to communication link 108-2 used for client terminal 106-2. Virtual conference manager 104 may also send a redirect signal 112 to client terminal 106-3, thereby informing client terminal 106-3 to begin communicating with conferencing server 102 via client terminal 106-2. Client terminal 106-2 operating as a virtual conferencing server may receive video stream 114 for client terminal 106-3 over communication link 108-2, and then forward video stream 114 received via communication link 108-2 to client terminal 106-3 using a communication link 116 between client terminals 106-2, 106-3. The operations of the virtual server in client terminal 106-2 may include traffic shaping to account for bandwidth on link 116. Operations may also include adjustment in the contents of the audio and video streams to adjust the bitstream to the reduced computational performance in client terminal 106-3.

Virtual conference manager 104 may also receive capabilities information for client terminals 106-1-*m*, and select one or more client terminals 106-1-*m* as a virtual conferencing server based on the capabilities information. Capabilities information may include information on computing or communication resources available to a given client terminal 106-1-*m*, such as an input bit rate budget, output bit rate budget, processor speed, memory capacity, speed for communication connections 218, and so forth. In one embodiment, for example, virtual conference manager 104 may receive capabilities information in the form of bit rate budgets for client terminals 106-1-*m*. For example, virtual conference manager 104 may receive an input bit rate budget estimate and an output bit rate budget estimate for client terminal 106-2, and a bandwidth estimate for communication link 108-3 used by client terminal 106-3. Virtual conference manager 104 may compare the input bit rate budget estimate and the output bit rate budget estimate with the bandwidth estimate. If the input bit rate budget estimate and/or output bit rate budget estimate are sufficient to accommodate the bit rate of video stream 114 as inferred from the bandwidth estimate for communication link 108-3, virtual conference manager 104 may select client terminal 106-2 as a virtual conferencing server, and perform redirect operations as previously described. Alternatively, virtual conference manager 104 may directly receive a bit rate estimate for video stream 114 via direct measurements or some other source, such as a receiver or video encoder/decoder/transcoder for conferencing server 102, thereby reducing or obviating the need for the bandwidth estimate 108-3.

In some embodiments, multiple client terminals 106-1-*m* that are located geographically close together may be requested to become multiple virtual conferencing servers and share the load of the other client terminals 106-1-*m* between themselves. This may facilitate, for example, other client terminals 106-1-*m* to be moved between the virtual conferencing servers if one of the client terminals 106-1-*m* joins or leaves the conference call.

In various embodiments, virtual conference manager 104 may select multiple client terminals 106-1-*m* to become multiple virtual conferencing servers, thereby forming one or more virtual conferencing server clusters. Based on the location information and distribution plan, virtual conference manager 104 may select clusters of client terminals 106-1-*m* to operate as clusters of virtual conferencing servers. A virtual conferencing server cluster may service a particular group of client terminals 106-1-*m* in a conference call, such as all the client terminals within a given geographic proximity (e.g., building, intrastate locale, interstate locale, region, country, and so forth). This may be desirable for high-availability operations in the event of failure for a virtual conferencing server in a virtual conferencing server cluster, where operations for the failed virtual conferencing server may be taken over by another virtual conferencing server in the same virtual conferencing server cluster. Having virtual conferencing server clusters may also facilitate adding or dropping client terminals 106-1-*m* during the course of a conference call as participants join or exit the conference call.

Referring again to FIG. 1, by way of example, assume virtual conference manager 104 selects client terminals 106-4, 106-5 as virtual conferencing servers for a virtual conferencing server cluster 118. Virtual conferencing server cluster 118 may provide conference call services similar to conferencing server 102 to a number of different client terminals, such as client terminals 106-6-*m*, via communication links 120, 126. Assume first virtual conferencing server 106-4 provides conference call services to client terminal 106-6 as indicated by arrow 122. If a failure condition is detected for client terminal 106-4 operating as a first virtual conferencing server, client terminal 106-6 may be transferred from the first virtual conferencing server 106-4 to the second virtual conferencing server 106-5 as indicated by arrow 124. Client terminal 106-6 may then begin receiving video stream 114 via virtual conferencing server 106-5 and communication link 126. Alternatively, client terminal 106-6 may be transferred to a different client terminal operating as a virtual conferencing server, or directly back to conferencing server 102.

Virtual conference manager 104 may also factor in current traffic loads for communication links 108-1-*n* for client terminals 106-1-*m* when selecting a given client terminal 106-1-*m* to become a virtual conferencing server. Referring again to our example with virtual conferencing server cluster 118, virtual conferencing server cluster 118 may provide conference call services similar to conferencing server 102 to a number of different client terminals, such as client terminal 106-6-*m*, via communication links 120, 126. Assume first virtual conferencing server 106-4 provides conference call services to client terminal 106-6 as indicated by arrow 122. If traffic load conditions between virtual conferencing server 106-4 and client terminal 106-6 via communication link 120 exceed a defined threshold, client terminal 106-6 may be transferred from the first virtual conferencing server 106-4 to the second virtual conferencing server 106-5 via communication link 126 as indicated by arrow 124. Client terminal 106-6 may then begin receiving video stream 114 via virtual conferencing server 106-5 and communication link 126. Alternatively, client terminal 106-6 may be transferred to a different client terminal operating as a virtual conferencing server, or directly back to conferencing server 102.

In addition to sharing or distributing conference call operations between conferencing server 102 and one or more virtual conferencing servers, a virtual conferencing server may also share or perform certain media processing operations on behalf of conferencing server 102 and/or one or more client terminals 106-1-*m*. Furthermore, certain media processing operations for conferencing server 102, a virtual conferencing server, or client terminal 106-1-*m*, may be partitioned and distributed among multiple virtual conferencing servers.

In various embodiments, certain media processing operations for a client terminal 106-1-*m* or group of client terminals 106-1-*m* may be distributed or offloaded from one or more client terminals 106-1-*m* to one or more virtual conferencing servers. Examples of media processing operations may include, but are not limited to, security operations (e.g., encryption, decryption, integrity checks, and so forth), packet processing, video encoding/decoding, video transcoding, trans-rating, audio encoding/decoding, media mixing, and so forth. One or more virtual conferencing servers may then provide the offloaded media processing operations to other client terminals 106-1-*m* involved in the conference call.

In one embodiment, for example, a number of virtual conferencing servers close to a group of client terminals 106-1-*m* can be responsible for packet input/output (I/O) and security. The decrypted traffic can be merged into a single stream and forwarded to another virtual conferencing server that is arranged to decode the media, perform media mixing, and re-encodes the media. The virtual conferencing server may then send a small number of streams back to the other virtual conferencing servers that encrypt and sends the encrypted media information to all the client terminals 106-1-*m*. In this manner, two particular processor intensive operations may be offloaded from the main virtual conferencing server to other secondary virtual conferencing servers.

In addition, the bandwidth used between virtual conferencing servers is reduced by deploying the slave virtual conferencing servers at remote sites. If all the virtual conferencing servers are capable of doing transcoding as well as being a slave virtual conferencing server for encryption and forwarding, and if the master virtual conferencing server fails for any reason, one of the slave virtual conferencing servers can become the master virtual conferencing server for the conference.

Another example of this media processing operational split or distribution may be implemented using a virtual conferencing server cluster. One of the client terminals 106-1-*m* in the cluster may be designated as the master virtual conferencing server, while other client terminals 106-1-*m* may be designated as slave virtual conferencing servers for a conference. This allows all the client terminals 106-1-*m* in a cluster to be used in a conference call.

Another example of this media processing operational split or distribution may be implemented using a single multiprocessor machine. For example, a multiprocessor machine or device may be selected as a virtual conferencing server. The multiprocessor machine may be partitioned into multiple threads each capable of running on a different processor. While it may be more efficient for a single thread to do the processing for a single conference, a master conference thread may own the conference and do the transcoding and media mixing, but hand off the packets to one or more slave threads to do such operations as encryption, decryption and sending. This would allow a single conference to use all of the processors in a multiprocessor machine rather than scale only to the size of a single processor.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 3:
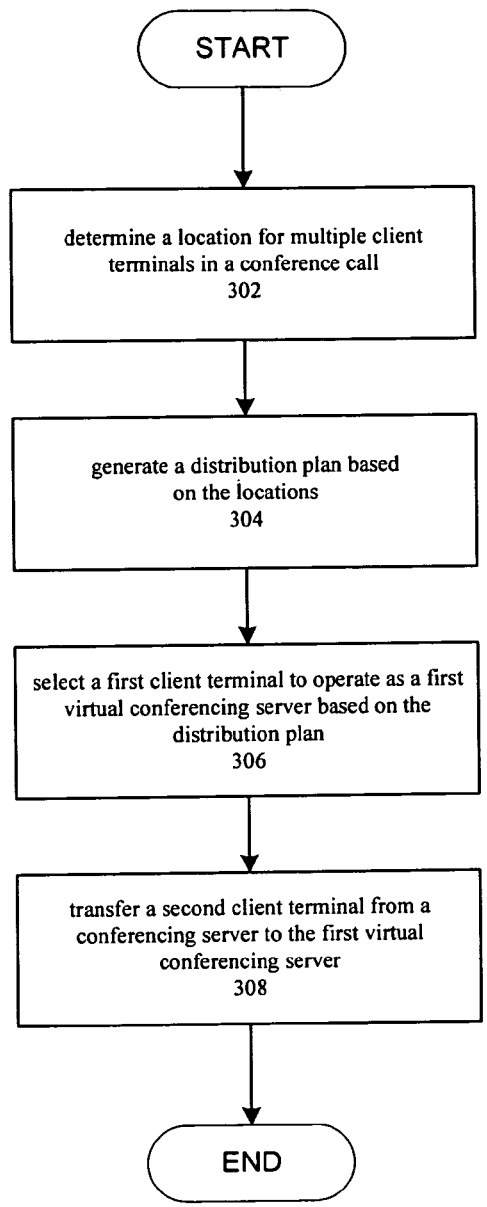

FIG. 3 illustrates one embodiment of a logic flow 300. Logic flow 300 may be representative of the operations executed by one or more embodiments described herein, such as multimedia conferencing system 100, conferencing server 102, virtual conference manager 104, client terminal 106, and/or virtual conferencing server module 110. As shown in FIG. 3, a location may be determined for multiple client terminals in a conference call at block 302. A distribution plan may be generated based on the locations at block 304. A first client terminal may be selected to operate as a first virtual conferencing server based on the distribution plan at block 306. A second client terminal may be transferred from a conferencing server to the first virtual conferencing server at block 308. Once transferred, video information in a video stream for the second client terminal may be sent from the conferencing server to the first virtual conferencing server. The embodiments are not limited in this context.

In one embodiment, for example, a first bandwidth estimate from the first client terminal and a second bandwidth estimate from the second client terminal may be received. The first bandwidth estimate may be compared with the second bandwidth estimate. The first client terminal may be selected to operate as the first virtual conferencing server based on the comparison. The embodiments are not limited in this context.

In one embodiment, for example, an input bit rate budget estimate and an output bit rate budget estimate may be received for the first client terminal. A bandwidth estimate may also be received for the second client terminal. The input bit rate budget estimate and the output bit rate budget estimate may be compared with the bandwidth estimate. The first client terminal may be selected to operate as the first virtual conferencing server based on the comparison. The embodiments are not limited in this context.

In one embodiment, for example, various media processing operations may be performed by the first virtual conferencing server for the second client terminal, such as security operations (e.g., encryption, decryption), video encoding/decoding operations, video transcoding operations, trans-rating, audio encoding/decoding operations, media mixing, and so forth. The embodiments are not limited in this context.

In one embodiment, for example, a third client terminal may be selected to operate as a second virtual conferencing server based on the distribution plan, with the first virtual conferencing server and the second virtual conferencing server forming a virtual conferencing server cluster. The virtual conferencing server cluster may have various use cases. For example, a failure condition may be detected for the first virtual conferencing server, and the second client terminal may be transferred from the first virtual conferencing server to the conferencing server or second virtual conferencing server. The embodiments are not limited in this context.

In one embodiment, for example, a third client terminal may be selected to operate as a second virtual conferencing server based on the distribution plan, with the first virtual conferencing server and the second virtual conferencing server forming a virtual conferencing server cluster. The virtual conferencing server cluster may have various use cases. For example, a current traffic load may be detected for the first virtual conferencing server, and the second client terminal may be transferred from the first virtual conferencing server to the conferencing server or second virtual conferencing server to reduce the current traffic load for the first virtual conferencing server. The embodiments are not limited in this context.

Another advantage of the concept of using virtual conference servers leads to the possibility to lay out efficient topologies in the case of scalable video. For example, the first conference server may forward the current video source (106-1) to all participants that can receive and process the video stream "as is" where no traffic shaping is needed in the server. One of the client terminals may become a virtual server and has the responsibility to do a first pass at traffic shaping such as removing an initial set of temporal/spatial scales in order to adjust the video rate sent to the participants who can receive and process the video stream at slightly less rate/complexity than the original video. A client terminal may be selected as a second virtual server and is responsible for removing additional temporal/spatial scales to adjust to a set of clients with even bandwidth or performance capability, and so forth. This is a special case illustrating that the distribution map of the virtual servers can be driven by considering an aggregation of client terminals connected at similar bandwidth and/or sharing similar performance/capability.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, computing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, CD-ROM, CD-R, CD-RW, optical disk, magnetic media, magneto-optical media, removable memory cards or disks, various types of DVD, a tape, a cassette, or the like.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:
1. A method, comprising:
   determining one or more locations at a conferencing server for multiple client terminals in a conference call based on location information received from one or more of the multiple client terminals that indicates a geographic location for each of the one or more multiple client terminals;
generating a distribution plan at the conferencing server based on said one or more geographic locations to distribute data among the one or more geographic locations, the distribution plan to determine efficient distribution of media information across the multiple client terminals, the distribution plan including a selection of one or more client terminals of the multiple client terminals to operate as one or more virtual conferencing servers;
transforming a first client terminal of the selected one or more client terminals at the conferencing server to operate as a first virtual conferencing server based on said distribution plan; and
transferring a second client terminal from the conferencing server to said first virtual conferencing server, said transferring comprising recording control information at the conferencing server and sending said control information to said first virtual conferencing server, said control information comprising at least one of an audio processing state, a video processing state, or a signaling state.

2. The method of claim 1, comprising sending video information in a video stream for said second client terminal from said conferencing server to said first virtual conferencing server.

3. The method of claim 1, comprising:
receiving a first bandwidth estimate from said first client terminal and a second bandwidth estimate from said second client terminal;
comparing said first bandwidth estimate with said second bandwidth estimate; and
selecting said first client terminal to operate as said first virtual conferencing server based on said comparison.

4. The method of claim 1, comprising:
receiving an input bit rate budget estimate and an output bit rate budget estimate for said first client terminal;
receiving a bandwidth estimate for said second client terminal;
comparing said input bit rate budget estimate and said output bit rate budget estimate with said bandwidth estimate; and
selecting said first client terminal to operate as said first virtual conferencing server based on said comparison.

5. The method of claim 1, comprising performing media processing operations by said first virtual conferencing server for said second client terminal.

6. The method of claim 1, comprising performing security operations by said first virtual conferencing server for said second client terminal.

7. The method of claim 1, comprising performing video encoding or decoding operations by said first virtual conferencing server for said second client terminal.

8. The method of claim 1, comprising performing video transcoding or video trans-rating operations by said first virtual conferencing server for said second client terminal.

9. The method of claim 1, comprising performing audio encoding or decoding operations by said first virtual conferencing server for said second client terminal.

10. The method of claim 1, comprising selecting a third client terminal to operate as a second virtual conferencing server based on said distribution plan, said first virtual conferencing server and said second virtual conferencing server forming a virtual conferencing server cluster.

11. The method of claim 1, comprising:
detecting a failure condition for said first virtual conferencing server; and
transferring said second client terminal from said first virtual conferencing server to said conferencing server.

12. The method of claim 1, comprising:
selecting a third client terminal to operate as a second virtual conferencing server based on said distribution plan;
detecting a failure condition for said first virtual conferencing server; and
transferring said second client terminal from said first virtual conferencing server to said second virtual conferencing server.

13. The method of claim 1, comprising:
selecting a third client terminal to operate as a second virtual conferencing server based on said distribution plan;
determining a current traffic load for said first virtual conferencing server; and
transferring said second client terminal from said first virtual conferencing server to said second virtual conferencing server to reduce said current traffic load for said first virtual conferencing server.

14. An apparatus comprising a conferencing server to manage a conference call with multiple client terminals, said conferencing server having a virtual conference manager to receive location information from one or more of the multiple client terminals, determine, by circuitry, one or more geographic locations for the multiple client terminals based on the received location information, generate a distribution plan based on the one or more geographic locations to distribute data among the one or more locations, the distribution plan to determine efficient distribution of media information across the multiple client terminals, the distribution plan including a selection of one or more client terminals of the multiple client terminals to operate as one or more virtual conferencing servers, transform a first client terminal of the selected one or more client terminals to operate as a first virtual conferencing server based on said distribution plan by recording control information at said conferencing server and sending said control information to said first virtual conferencing server, said control information comprising at least one of an audio processing state, a video processing state, or a signaling state, and transfer conference call operations for a second client terminal from said conferencing server to said first virtual conferencing server.

15. The apparatus of claim 14, said conferencing server sending video information in a video stream for said second client terminal to said first virtual conferencing server.

16. The apparatus of claim 14, said first virtual conferencing server performing video transcoding operations for said second client terminal.

17. The apparatus of claim 14, said virtual conference manager to receive capabilities information for said client terminals, and select said first client terminal as said first virtual conferencing server based on said capabilities information.

18. The apparatus of claim 14, said first virtual conferencing server performing encryption operations for said second client terminal.

19. The apparatus of claim 14, said first virtual conferencing server performing video decoding operations for said second client terminal.

20. An article comprising at least one of a memory unit and a storage device containing instructions that if executed enable a system to:

determine one or more geographic locations at a conferencing server for multiple client terminals in a conference call based on location information received from one or more of the multiple client terminals;

generate a distribution plan at the conferencing server based on said one or more geographic locations to distribute data among the one or more geographic locations, the distribution plan to determine efficient distribution of media information across the multiple client terminals, the distribution plan including a selection of one or more client terminals of the multiple client terminals to operate as one or more virtual conferencing servers;

transform a first client terminal of the selected one or more client terminals at the conferencing server to operate as a first virtual conferencing server based on said distribution plan by recording control information at said conferencing server and sending said control information to said first virtual conferencing server, said control information comprising at least one of an audio processing state, a video processing state, or a signaling state; and transfer a second client terminal from the conferencing server to said first virtual conferencing server.

21. The article of claim 20, further comprising instructions that if executed enable the system to select a third client terminal as a second virtual conferencing server to remove additional temporal/spatial scales to adjust to a set of client terminals with even bandwidth or performance capability.

22. The article of claim 20, further comprising instructions that if executed enable the system to send video information in a video stream for said second client terminal from said conferencing server to said first virtual conferencing server.

23. The article of claim 20, further comprising instructions that if executed enable the system to:
  receive a first bandwidth estimate from said first client terminal and a second bandwidth estimate from said second client terminal;
  compare said first bandwidth estimate with said second bandwidth estimate; and
  select said first client terminal to operate as said first virtual conferencing server based on said comparison.

24. The article of claim 20, further comprising instructions that if executed enable the system to:
  receive an input bit rate budget estimate and an output bit rate budget estimate for said first client terminal;
  receive a bandwidth estimate for said second client terminal;
  compare said input bit rate budget estimate and said output bit rate budget estimate with said bandwidth estimate; and
  select said first client terminal to operate as said first virtual conferencing server based on said comparison.

25. The article of claim 20, further comprising instructions that if executed enable the system to perform media processing operations by said first virtual conferencing server for said second client terminal.

26. The article of claim 20, further comprising instructions that if executed enable the system to perform encryption operations by said first virtual conferencing server for said second client terminal.

27. The article of claim 20, further comprising instructions that if executed enable the system to perform video decoding operations by said first virtual conferencing server for said second client terminal.

28. The article of claim 20, further comprising instructions that if executed enable the system to perform video transcoding or video trans-rating operations by said first virtual conferencing server for said second client terminal.

29. The article of claim 20, further comprising instructions that if executed enable the system to perform audio decoding operations by said first virtual conferencing server for said second client terminal.

30. The article of claim 20, further comprising instructions that if executed enable the system to select a third client terminal to operate as a second virtual conferencing server based on said distribution plan, said first virtual conferencing server and said second virtual conferencing server forming a virtual conferencing server cluster.

31. The article of claim 20, further comprising instructions that if executed enable the system to:
  detect a failure condition for said first virtual conferencing server; and transfer said second client terminal from said first virtual conferencing server to said conferencing server.

32. The article of claim 20, further comprising instructions that if executed enable the system to:
  select a third client terminal to operate as a second virtual conferencing server based on said distribution plan;
  detect a failure condition for said first virtual conferencing server; and
  transfer said second client terminal from said first virtual conferencing server to said second virtual conferencing server.

33. The article of claim 20, further comprising instructions that if executed enable the system to:
  select a third client terminal to operate as a second virtual conferencing server based on said distribution plan;
  determine a current traffic load for said first virtual conferencing server; and
  transfer said second client terminal from said first virtual conferencing server to said second virtual conferencing server to reduce said current traffic load for said first virtual conferencing server.

* * * * *